United States Patent
Parekh et al.

(10) Patent No.: US 12,355,659 B2
(45) Date of Patent: Jul. 8, 2025

(54) ULTIMATE REGIONAL FALLBACK PATH FOR HIERARCHICAL SD-WAN

(71) Applicant: Cisco Technology, Inc., San Jose, CA (US)

(72) Inventors: Jigar Parekh, Fremont, CA (US); Satyajit Das, Livermore, CA (US); Prithvi Sharan, Germantown, MD (US); Laxmikantha Reddy Ponnuru, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 412 days.

(21) Appl. No.: 17/687,821

(22) Filed: Mar. 7, 2022

(65) Prior Publication Data

US 2023/0188460 A1 Jun. 15, 2023

Related U.S. Application Data

(60) Provisional application No. 63/288,080, filed on Dec. 10, 2021.

(51) Int. Cl.
*H04L 45/28* (2022.01)
*H04L 41/06* (2022.01)

(52) U.S. Cl.
CPC ............ *H04L 45/28* (2013.01); *H04L 41/06* (2013.01)

(58) Field of Classification Search
CPC ..... H04L 45/28; H04L 41/06; H04L 41/0663; H04L 41/40; H04L 45/04; H04L 45/22; H04L 45/50; H04L 45/64
See application file for complete search history.

(56) References Cited

U.S. PATENT DOCUMENTS

| | | | |
|---|---|---|---|
| 8,942,085 B1 | 1/2015 | Pani et al. | |
| 2006/0209682 A1 | 9/2006 | Filsfils | |
| 2016/0218917 A1* | 7/2016 | Zhang | H04L 45/42 |
| 2017/0207996 A1 | 7/2017 | Lui et al. | |
| 2019/0158605 A1* | 5/2019 | Markuze | H04L 69/163 |
| 2020/0076730 A1 | 3/2020 | Comeras et al. | |
| 2020/0287819 A1* | 9/2020 | Theogaraj | H04L 45/74 |
| 2020/0382341 A1* | 12/2020 | Ore et al. | H04L 12/465 |
| 2020/0413283 A1 | 12/2020 | Shen et al. | |
| 2021/0067427 A1 | 3/2021 | Cidon et al. | |
| 2021/0111991 A1* | 4/2021 | Vadera | H04L 45/50 |

(Continued)

FOREIGN PATENT DOCUMENTS

EP  3748923 A1  12/2020
FR  2906429 A1  3/2008

OTHER PUBLICATIONS

International Search Report corresponding to PCT/US2022/080472, dated Mar. 1, 2023, 11 pages.

*Primary Examiner* — Donald L Mills
(74) *Attorney, Agent, or Firm* — Baker Botts L.L.P.

(57) ABSTRACT

In one embodiment, a method includes determining, by a network node, that a first plurality of tunnel interfaces resides in a core region of a network and determining, by the network node, that a second plurality of tunnel interfaces resides in an access region of the network. The method also includes configuring, by the network node, a first tunnel interface as a core regional fallback path for the core region of the network and configuring, by the network node, a second tunnel interface as an access regional fallback path for the access region of the network.

14 Claims, 3 Drawing Sheets

(56) References Cited

U.S. PATENT DOCUMENTS

| | | |
|---|---|---|
| 2021/0152450 A1 | 5/2021 | Iyer et al. |
| 2022/0038554 A1* | 2/2022 | Merwaday .............. H04L 45/64 |
| 2022/0103470 A1* | 3/2022 | Kulkarni ............. H04L 12/2863 |
| 2023/0059537 A1* | 2/2023 | Gavand ............... H04L 67/1006 |
| 2023/0116163 A1* | 4/2023 | Scholz ................ H04L 61/2567 |
| | | 370/392 |
| 2023/0283661 A1* | 9/2023 | Hood .................. H04L 41/5006 |
| | | 709/223 |

* cited by examiner

ULTIMATE REGIONAL FALLBACK PATH FOR HIERARCHICAL SD-WAN

CROSS-REFERENCE TO RELATED APPLICATIONS

This application claims benefit of U.S. Provisional Patent Application No. 63/288,080 filed Dec. 10, 2021 by Jigar Parekh et al, and entitled "ULTIMATE REGIONAL FALLBACK PATH FOR HIERARCHICAL SD-WAN," which is incorporated herein by reference as if reproduced in its entirety.

TECHNICAL FIELD

The present disclosure relates generally to communication networks, and more specifically to systems and methods for generating an ultimate regional fallback path for hierarchical software-defined wide area network (SD-WAN).

BACKGROUND

An SD-WAN is a software-defined approach to managing the wide area network (WAN). In an SD-WAN environment, last-resort-circuit is a fallback path available on the WAN edge device that may be used when all WAN connectivity on the device is lost. The objective of the last-resort-circuit is to provide a temporary WAN circuit that can keep the WAN edge device linked with the overall network. However, this intent is lost with the hierarchical form of deployment, where certain devices operate across multiple regions.

DESCRIPTION OF EXAMPLE EMBODIMENTS

Overview

Figure 1:
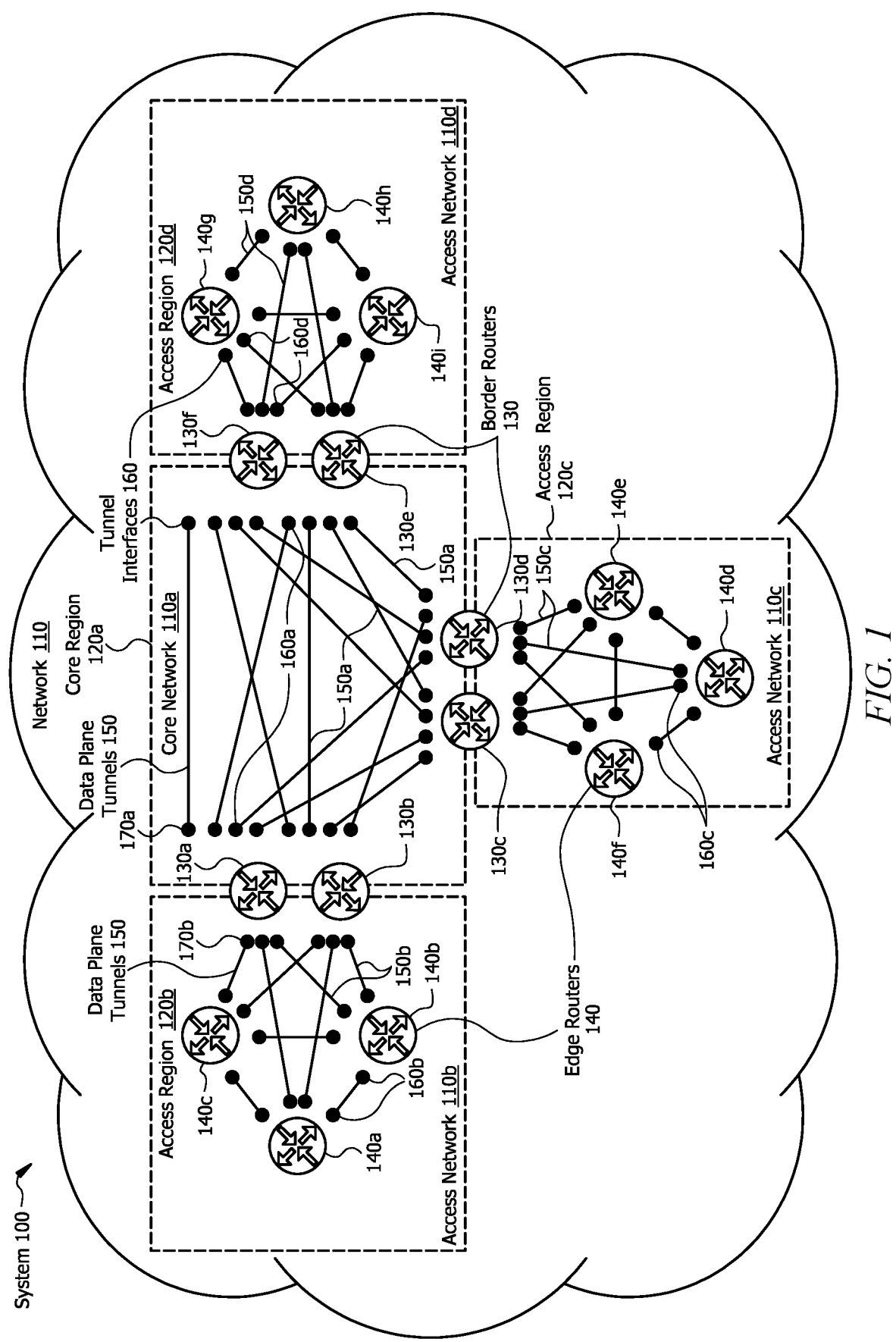
FIG. 1 illustrates an example system for generating an ultimate regional fallback path for hierarchical SD-WAN.

According to an embodiment, a network node includes one or more processors and one or more computer-readable non-transitory storage media coupled to the one or more processors and including instructions that, when executed by the one or more processors, cause the network node to perform operations. The operations include determining that a first plurality of tunnel interfaces resides in a core region of a network and determining that a second plurality of tunnel interfaces resides in an access region of the network. The operations also include configuring a first tunnel interface as a core regional fallback path for the core region of the network and configuring a second tunnel interface as an access regional fallback path for the access region of the network.

In certain embodiments, the operations further include determining that the first plurality of tunnel interfaces loses connectivity to a data plane of the core region of the network and, in response to determining that the first plurality of tunnel interfaces loses connectivity to the data plane of the core region the network, activating the first tunnel interface. In some embodiments, the operations further include determining that the second plurality of tunnel interfaces loses connectivity to a data plane of the access region of the network and, in response to determining that the second plurality of tunnel interfaces loses connectivity to the data plane of the access region the network, activating the second tunnel interface.

In certain embodiments, a determination to activate the first tunnel interface is independent of a determination to activate the second tunnel interface. In some embodiments, the first tunnel interface is connected to a first Internet Protocol Security (IPSec) data plane tunnel that resides in the core region, and/or the second tunnel interface is connected to a second IPSec data plane tunnel that resides in the access region. In certain embodiments, Bidirectional Forwarding Detection (BFD) is used to determine data plane connectivity within the network. In some embodiments, the network is a hierarchical SD-WAN. In certain embodiments, the network node is a border router.

According to another embodiment, a method includes determining, by a network node, that a first plurality of tunnel interfaces resides in a core region of a network and determining, by the network node, that a second plurality of tunnel interfaces resides in an access region of the network. The method also includes configuring, by the network node, a first tunnel interface as a core regional fallback path for the core region of the network and configuring, by the network node, a second tunnel interface as an access regional fallback path for the access region of the network.

According to yet another embodiment, one or more computer-readable non-transitory storage media embody instructions that, when executed by a processor, cause the processor to perform operations. The operations include determining that a first plurality of tunnel interfaces resides in a core region of a network and determining that a second plurality of tunnel interfaces resides in an access region of the network. The operations also include configuring a first tunnel interface as a core regional fallback path for the core region of the network and configuring a second tunnel interface as an access regional fallback path for the access region of the network.

Technical advantages of certain embodiments of this disclosure may include one or more of the following. This disclosure describes systems and methods for generating an ultimate regional fallback path for hierarchical SD-WAN, which allows devices, such as border routers, to continue operation across multiple regions. Certain embodiments of this disclosure ensure end-to-end data plane connectivity on a per-region basis in a hierarchical SD-WAN. Certain embodiments described herein prevent and/or reduce data-plane disruption in hierarchical SD-WAN deployments. The systems and methods described herein can be scaled up to include several regions.

Certain embodiments described herein apply hierarchical SD-WAN, which simplifies policy design. Hierarchical SD-WAN may prevent traffic black holes (routing failure that can occur when a device responsible for one of the hops between the source and destination of a traffic flow is unavailable) caused by policy. Hierarchical SD-WAN may provide end-to-end encryption of inter-region traffic. Hierarchical SD-WAN provides flexibility to select the best transport for each region. This flexibility can provide for better performance for traffic across geographical regions. In certain embodiments, an entity may arrange to use premium traffic transport for a core region, which provides better traffic performance across distant geographical regions. Hierarchical SD-WAN may provide better control over traffic paths between domains. In certain embodiments, hierarchical SD-WAN allows site-to-site traffic paths between disjoint providers (two providers that cannot provide direct IP routing reachability between them).

Certain embodiments described herein use principles of tunneling to encapsulate traffic in another protocol, which enables multiprotocol local networks over a single-protocol backbone. Tunneling may provide workarounds for networks that use protocols that have limited hop counts (e.g., Routing information Protocol (RIP) version 1, AppleTalk, etc.). Tunneling may be used to connect discontiguous subnetworks.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for generating an ultimate regional fallback path for hierarchical SD-WAN. Certain devices, such as border routers, may operate across multiple regions. Last-resort-circuit is designed to be the ultimate device-level fallback path for regular SD-WAN deployments. Hierarchical SD-WAN introduces the concept of regions. The division into regions creates a distinction between intra-region traffic and inter-region traffic. For intra-region traffic, edge routers connect directly to other edge routers within the region. For inter-region traffic, edge routers in one region do not connect directly to edge routers in a different region. Rather, the edge routers connect to core border routers, which forward the traffic to the core border routers assigned to the target region, and those border routers forward the traffic to the edge routers within the target region. Currently, there is no "per region" ultimate fallback path, which may cause data-plane disruption in hierarchical SD-WAN deployments.

A device's tunnel interface may be configured as a last-resort-circuit. This last-resort-circuit tunnel interface is in operationally-down mode if other tunnel interfaces are up on the device. If no other tunnel interfaces are up on the device, this last-resort-circuit comes operationally-up and forms tunnels accordingly. In hierarchical SD-WAN, tunnel interfaces are part of regions. As such, the last-resort-circuit comes up only when all regions lose all data-plane connectivity on the device. Consider a hierarchical SD-WAN that has a border router located at the boundary of a core region and an access region. If the last-resort-circuit on the border router is only part of the core region, then the core-region's data plane will be up as the ultimate fallback, but the access region will still be down. This breaks hierarchical SD-WAN's underlying principle since hierarchical SD-WAN needs both core and primary access regions to be up on a border router. This disclosure describes systems and methods for generating an ultimate regional fallback path for hierarchical SD-WAN, which will allow the border router to continue operation across multiple regions.

FIG. 1 illustrates an example system 100 for generating an ultimate regional fallback path for hierarchical SD-WAN. System 100 or portions thereof may be associated with an entity, which may include any entity, such as a business, company, or enterprise, that generates ultimate regional fallback paths for hierarchical SD-WAN. In certain embodiments, the entity may be a service provider that provides ultimate regional fallback paths for a network. The components of system 100 may include any suitable combination of hardware, firmware, and software. For example, the components of system 100 may use one or more elements of the computer system of FIG. 3. In the illustrated embodiment of FIG. 1, system 100 includes network 110, regions 120, border routers 130, edge routers 140, data plane tunnels 150, tunnel interfaces 160, and fallback tunnel interfaces 170.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a LAN, a wireless LAN (WLAN), a virtual LAN (VLAN), a WAN, a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks.

Network 110 may be any communications network, such as a private network, a public network, a connection through the Internet, a mobile network, a WI-FI network, etc. Network 110 may include a core network, an access network of a service provider, an Internet service provider (ISP) network, and the like. An access network is the part of the network that provides a user access to a service. A core network is the part of the network that acts like a backbone to connect the different parts of the access network(s). One or more components of system 100 may communicate over network 110. In the illustrated embodiment of FIG. 1, network 110 is an SD-WAN.

Network 110 of FIG. 1 includes a core network 110a, an access network 110b, an access network 110c, and an access network 110d. In certain embodiments, core network 110a is a "middle mile" network, which is the segment of a telecommunications network linking a network operator's core network to one or more local networks. The "middle mile" network may include the backhaul network to the nearest aggregation point and/or any other parts of network 110 needed to connect the aggregation point to the nearest point of presence on the operator's core network. In certain embodiments, access network 110b, access network 110c, and access network 110d are "last mile" networks, which are local links used to provide services to end users.

Regions 120 of system 100 represent distinct networks of system 100. In certain embodiments, a user defines regions 120 such that different traffic transport services can be used for each region 120. In the illustrated embodiment of FIG. 1, regions 120 include a core region 120a, an access region 120b, an access region 120c, and an access region 120d. Regions 120 (e.g., core region 120a, access region 120b, access region 120c, and access region 120d) may be associated with different geographical locations and/or data centers. For example, core region 120a may be associated with an enterprise's main office located in California, access region 120b may be associated with the enterprise's branch office located in Texas, access region 120c may be associated with the enterprise's branch office located in New York, and access region 120d may be associated the enterprise's branch office located in Illinois. As another example, core region 120a may be associated with a data center located in US West, access region 120b may be associated with a data center located in US East, access region 120c may be associated with a data center located in Canada West, and access region 120*d* may be associated with a data center located in Canada East.

In certain embodiments, core region 120*a* may be used for traffic between distinct geographical regions. Core region 120*a* may use a premium transport service to provide a required level of performance and/or cost effectiveness for long-distance connectivity. In some embodiments, different network topologies may be used in different regions 120 (e.g., core region 120*a*, access region 120*b*, access region 120*c*, and access region 120*d*). For example, access region 120*b* may use a full mesh of SD-WAN tunnels, access region 120*c* may use a hub-and-spoke topology, and access region 120*d* may use a full mesh topology with dynamic tunnels. In certain embodiments, core region 120*a* uses a full mesh of tunnels for the overlay topology. For example, each border router 130 in core region 120*a* may have a tunnel to each other border router 130 in core region 120*a*. These direct tunnels may provide optimal connectivity for forwarding traffic from one region 120 to another.

Each region 120 of system 100 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more virtual machines, bare metal servers, and the like. As another example, nodes may include data communications equipment such as computers, routers, servers, printers, workstations, switches, bridges, modems, hubs, and the like. The nodes of network 110 may include one or more border routers 130, edge routers 140, and the like.

Border routers 130 of system 100 are specialized routers that reside at a boundary of two or more different types of networks 110 (e.g., core network 110*a*, access network 110*b*, access network 110*c*, and access network 110*d*). In certain embodiments, border routers 130 use static and/or dynamic routing to send data to and/or receive data from different networks 110 (e.g., core network 110*a*, access network 110*b*, access network 110*c*, and access network 110*d*) of system 100. Each region 120 (e.g., core region 120*a*, access region 120*b*, access region 120*c*, and access region 120*d*) of system 100 requires at least one border router 130 to facilitate communication with other regions 120 (e.g., core region 120*a*, access region 120*b*, access region 120*c*, and access region 120*d*) of system 100. Border routers 130 may include one or more hardware devices, one or more servers that include routing software, and the like. In certain embodiments, border routers 130 use VPN forwarding tables to route traffic flows between tunnel interfaces 160 that provide connectivity to core region 120*a* and tunnel interfaces 160 that provide connectivity to access region 120*b*, access region 120*c*, or access region 120*d*.

In the illustrated embodiment of FIG. 1, border routers 130 include a border router 130*a*, a border router 130*b*, a border router 130*c*, a border router 130*d*, a border router 130*e*, and a border router 130*f*. Border router 130*a* and border router 130*b* reside at the boundary of core region 120*a* and access region 120*b*. Border router 130*c* and border router 130*d* reside at the boundary of core region 120*a* and access region 120*c*. Border router 130*e* and border router 130*f* reside at the boundary of core region 120*a* and access region 120*d*.

Edge routers 140 of system 100 are specialized routers that reside at an edge of network 110. In certain embodiments, edge routers 140 use static and/or dynamic routing to send data to and/or receive data from one or more networks 110 (e.g., core network 110*a*, access network 110*b*, access network 110*c*, and access network 110*d*) of system 100. Edge routers 140 may include one or more hardware devices, one or more servers that include routing software, and the like. In the illustrated embodiment of FIG. 1, edge routers 140 include an edge router 140*a*, an edge router 140*b*, an edge router 140*c*, an edge router 140*d*, an edge router 140*e*, an edge router 140*f*, an edge router 140*g*, an edge router 140*h*, and an edge router 140*i*. Edge router 140*a*, edge router 140*b*, and edge router 140*c* reside in access region 120*b* at the edge of access network 110*b*. Edge router 140*d*, edge router 140*e*, and edge router 140*f* reside in access region 120*c* at the edge of access network 110*c*. Edge router 140*g*, edge router 140*h*, and edge router 140*i* reside in access region 120*c* at the edge of access network 110*d*. In certain embodiments, border routers 130 (e.g., border router 130*a*, border router 130*b*, border router 130*c*, border router 130*d*, border router 130*e*, and border router 1300 and edge routers 140 (e.g., edge router 140*a*, edge router 140*b*, edge router 140*c*, edge router 140*d*, edge router 140*e*, edge router 140*f*, edge router 140*g*, edge router 140*h*, and edge router 140*i*) send data to and/or receive data from other border routers 130 and edge routers 140 via data plane tunnels 150.

Data plane tunnels 150 of system 100 are links for communicating data between nodes of system 100. The data plane of system 100 is responsible for moving packets from one location to another. Data plane tunnels 150 provide a way to encapsulate arbitrary packets inside a transport protocol. For example, data plane tunnels 150 may encapsulate data packets from one protocol inside a different protocol and transport the data packets unchanged across a foreign network. Data plane tunnels 150 may use one or more of the following protocols: a passenger protocol (e.g., the protocol that is being encapsulated such as AppleTalk, Connectionless Network Service (CLNS), IP, Internetwork Packet Exchange (IPX), etc.); a carrier protocol (i.e., the protocol that does the encapsulating such as Generic Routing Encapsulation (GRE), IP-in-IP, Layer Two Tunneling Protocol (L2TP), MPLS, Session Traversal Utilities for NAT (STUN), Data Link Switching (DLSw), etc.); and/or a transport protocol (i.e., the protocol used to carry the encapsulated protocol). In certain embodiments, the main transport protocol is IP.

In certain embodiments, one or more data plane tunnels 150 are IPSec tunnels. IPSec provides secure tunnels between two peers (e.g., border routers 120 and/or edge routers 140). In certain embodiments, a user may define which packets are considered sensitive and should be sent through secure IPSec tunnels 150. The user may also define the parameters to protect these packets by specifying characteristics of IPSec tunnels 150. In certain embodiments, IPSec peers (e.g., border routers 120 and/or edge routers 140) set up secure tunnel 150 and encrypt the packets that traverse data plane tunnel 150 to the remote peer. In some embodiments, one or more data plane tunnels 150 are GRE tunnels. GRE may handle the transportation of multiprotocol and IP multicast traffic between two sites that only have IP unicast connectivity. In certain embodiments, one or more data plane tunnels 150 may use IPSec tunnel mode in conjunction with a GRE tunnel.

In the illustrated embodiment of FIG. 1, data plane tunnels 150 include data plane tunnels 150*a*, data plane tunnels 150*b*, data plane tunnels 150*c*, and data plane tunnels 150*d*. Data plane tunnels 150*a* are located in core region 120*a*, data plane tunnels 150*b* are located in access region 120*b*, data plane tunnels 150*c* are located in access region 120c, and data plane tunnels 150d are located in access region 120c. Data plane tunnels 150a are used to connect border routers 130 (e.g., border router 130a, border router 130b, border router 130c, border router 130d, border router 130e, and border router 130O that are located on a boundary of core region 120a. For example, data plane tunnels 150a may connect border router 130a to border router 130c, connect border router 130c to border router 130e, and the like. Data plane tunnels 150b are used to connect border routers 130 (e.g., border router 130a and border router 130b) and edge routers 140 (e.g., edge router 140a, edge router 140b, and edge router 140c) located on a boundary or edge of access region 120b. For example, data plane tunnels 150b may connect border router 130a to edge router 140a, connect edge router 140a to edge router 140b, and the like. Data plane tunnels 150c are used to connect border routers 130 (e.g., border router 130c and border router 130d) and edge routers 140 (e.g., edge router 140d, edge router 140e, and edge router 140O located on a boundary or edge of access region 120c. For example, data plane tunnels 150c may connect border router 130c to edge router 140f, connect edge router 140f to edge router 140e, and the like. Data plane tunnels 150d are used to connect border routers 130 (e.g., border router 130e and border router 130O and edge routers 140 (e.g., edge router 140g, edge router 140h, and edge router 140i) located on a boundary or edge of access region 120d. For example, data plane tunnels 150d may connect border router 130e to edge router 140i, connect edge router 140i to edge router 140h, and the like.

Data plane tunnels 150 (e.g., data plane tunnels 150a, data plane tunnels 150b, data plane tunnels 150c, and data plane tunnels 150d) connect to border routers 130 (e.g., border router 130a, border router 130b, border router 130c, border router 130d, border router 130e, and border router 130O and edge routers 140 (e.g., edge router 140a, edge router 140b, edge router 140c, edge router 140d, edge router 140e, edge router 140f, edge router 140g, edge router 140h, and edge router 140i) via tunnel interfaces 160. In certain embodiments, each tunnel interface 160 of system 100 is associated with a router port. Tunnel interfaces 160 may virtual (logical) interfaces that are used to communicate traffic along data plane tunnel 150. In certain embodiments, tunnel interfaces 160 are configured in a transport VPN. In some embodiments, tunnel interfaces 160 come up as soon as they are configured, and they stay up as long as the physical tunnel interface is up. In certain embodiments, tunnel interfaces 160 are not tied to specific "passenger" or "transport" protocols. Rather, tunnel interfaces 160 are designed to provide the services necessary to implement any standard point-to-point encapsulation scheme. In certain embodiments, tunnel interfaces 160 have either IPv4 or IPv6 addresses assigned. The router (e.g., border router 130 and/or edge router 140) at each end of data plane tunnel 150 may support the IPv4 protocol stack, the IPv6 protocol stack, or both the IPv4 and IPv6 protocol stacks. One or more tunnel interfaces 160 may be configured with a tunnel interface number, an IP address, a defined tunnel destination, and the like. Tunnel interfaces 160 of system 100 may include one or more IPSec tunnel interfaces, GRE tunnel interfaces, etc.

In the illustrated embodiment of FIG. 1, tunnel interfaces 160 include tunnel interfaces 160a, tunnel interfaces 160b, tunnel interfaces 160c, and tunnel interfaces 160d. Tunnel interfaces 160a are located at each endpoint of data plane tunnels 150a of core region 120a. Tunnel interfaces 160b are located at each endpoint of data plane tunnels 150b of access region 120b. Tunnel interfaces 160c are located at each endpoint of data plane tunnels 150c of access region 120c. Tunnel interfaces 160d are located at each endpoint of data plane tunnels 150d of access region 120d. In the illustrated embodiment of FIG. 1, border routers 130 (e.g., border router 130a, border router 130b, border router 130c, border router 130d, border router 130e, and border router 130O and edge routers 140 (e.g., edge router 140a, edge router 140b, edge router 140c, edge router 140d, edge router 140e, edge router 140f, edge router 140g, edge router 140h, and edge router 140i) include tunnel interfaces 160. Each border router 130 of FIG. 1 includes tunnel interfaces 160a that provide connectivity to core region 120a and separate tunnel interfaces 160b, tunnel interfaces 160c, and tunnel interfaces 160d that provide connectivity to access region 120b, access region 120c, or access region 120d, respectively.

In certain embodiments, one or more border routers 130 (e.g., border router 130a, border router 130b, border router 130c, border router 130d, border router 130e, and border router 130O and/or edge routers 140 (e.g., edge router 140a, edge router 140b, edge router 140c, edge router 140d, edge router 140e, edge router 140f, edge router 140g, edge router 140h, and edge router 140i) of system 100 determines data plane disruption by determining whether the node is sending and/or receiving packets for a particular data plane tunnel 150. For example, border router 130a may determine that it is experiencing data plane disruption for data plane tunnel 150a connecting border router 130a to border router 130c if border router 130a cannot successfully send data packets to border router 130c and/or receive data packets from border router 130c. Bidirectional Forwarding Detection (BFD) is a detection protocol that may be used by system 100 to determine whether one or more border routers 130 (e.g., border router 130a, border router 130b, border router 130c, border router 130d, border router 130e, and border router 130O and/or edge routers 140 (e.g., edge router 140a, edge router 140b, edge router 140c, edge router 140d, edge router 140e, edge router 140f, edge router 140g, edge router 140h, and edge router 140i) are experiencing data plane disruption. For example, BFD may be used to detect failures in the forwarding path between two border routers 130 (e.g., border router 130a, border router 130b, border router 130c, border router 130d, border router 130e, and border router 130O, including data plane tunnels 150a, tunnel interfaces 160a, and/or forwarding planes. In certain embodiments, BFD is enabled at the interface and/or routing protocol levels.

Fallback tunnel interfaces 170 of system 100 are tunnel interfaces 160 (e.g., tunnel interfaces 160a, tunnel interfaces 160b, tunnel interfaces 160c, and tunnel interfaces 160d) that are configured to be last resort tunnel interfaces on a per-region basis. In certain embodiments, each fallback tunnel interface 170 is configured as "ultimate-regional-fallback-path." The illustrated embodiment of FIG. 1 includes a fallback tunnel interface 170a and a fallback tunnel interface 170b. Fallback tunnel interface 170a is configured as the last resort tunnel interface for border router 130a for core region 120a. Fallback tunnel interface 170b is configured as the last resort tunnel interface for border router 130a for access region 120b.

If one or more (e.g., all) of the non-ultimate-regional-fallback-path data plane tunnels 150a associated with tunnel interfaces 160a go down (e.g., lose data plane connectivity), border router 130a brings up (e.g., establishes data plane connectivity for) fallback tunnel interface 170a for core region 120a. If one or more (e.g., one) of the non-ultimate-regional-fallback-path data plane tunnels 150a associated with tunnel interfaces 160a come up (e.g., experiences data plane connectivity), border router 130a will bring back down (e.g., remove data plane connectivity from) fallback tunnel interface 170a for core region 120a. This occurs irrespective of the state of tunnel interfaces 160b located in access region 120b, tunnel interfaces 160c located in access region 120c, and tunnel interfaces 160d located in access region 120d.

Similarly, if one or more (e.g., all) of the non-ultimate-regional-fallback-path data plane tunnels 150b associated with tunnel interfaces 160b of access region 120b go down, border router 130a brings up fallback tunnel interface 170b for access region 120b. If one or more (e.g., one) of the non-ultimate-regional-fallback-path data plane tunnels 150b associated with tunnel interfaces 160b come up, border router 130a will bring back down fallback tunnel interface 170b for the access region 120b. This occurs irrespective of state of tunnel interfaces 160a located in core region 120a, tunnel interfaces 160c located in access region 120c, and tunnel interfaces 160d located in access region 120d.

In operation, border router 130a of system 100 determines that a plurality of tunnel interfaces 160a reside in core region 120a of core network 110a. Border router 130a configures fallback tunnel interface 170a as a core regional fallback path for core region 120a of core network 110a. Border router 130a determines that a plurality of tunnel interfaces 160b reside in access region 120b of access network 110b. Border router 130a configures fallback tunnel interface 170b as an access regional fallback path for access region 120b of access network 110b. If border router 130a determines that tunnel interfaces 160a of core region 120a lose connectivity to a data plane of core region 120a of core network 110a, border router 130a activates fallback tunnel interface 170a, irrespective of the state of tunnel interfaces 160b, tunnel interfaces 160c, and tunnel interfaces 160d. If border router 130a determines that tunnel interfaces 160b of access region 120b lose connectivity to the data plane of access region 120b of access network 110b, border router 130a activates fallback tunnel interface 170b, irrespective of the state of tunnel interfaces 160a, tunnel interfaces 160c, and tunnel interfaces 160d. As such, system 100 of FIG. 1 ensures end-to-end data plane connectivity on a per-region basis in a hierarchical SD-WAN.

Although FIG. 1 illustrates a particular number of networks 110 (e.g., core network 110a, access network 110b, access network 110c, and access network 110d), regions 120 (e.g., core region 120a, access region 120b, access region 120c, and access region 120d), border routers 130 (e.g., border router 130a, border router 130b, border router 130c, border router 130d, border router 130e, and border router 130O), edge routers 140 (e.g., edge router 140a, edge router 140b, edge router 140c, edge router 140d, edge router 140e, edge router 140f, edge router 140g, edge router 140h, and edge router 140i), data plane tunnels 150, tunnel interfaces 160, and fallback tunnel interfaces 170, this disclosure contemplates any suitable number of networks 110, regions 120, border routers 130, edge routers 140, data plane tunnels 150, tunnel interfaces 160, and fallback tunnel interfaces 170. For example, system 100 may include more or less than four regions.

Although FIG. 1 illustrates a particular arrangement of networks 110 (e.g., core network 110a, access network 110b, access network 110c, and access network 110d), regions 120 (e.g., core region 120a, access region 120b, access region 120c, and access region 120d), border routers 130 (e.g., border router 130a, border router 130b, border router 130c, border router 130d, border router 130e, and border router 130O), edge routers 140 (e.g., edge router 140a, edge router 140b, edge router 140c, edge router 140d, edge router 140e, edge router 140f, edge router 140g, edge router 140h, and edge router 140i), data plane tunnels 150, tunnel interfaces 160, and fallback tunnel interfaces 170, this disclosure contemplates any suitable arrangement of network 110, regions 120, border routers 130, edge routers 140, data plane tunnels 150, tunnel interfaces 160, and fallback tunnel interfaces 170. Furthermore, although FIG. 1 describes and illustrates particular components, devices, or systems carrying out particular actions, this disclosure contemplates any suitable combination of any suitable components, devices, or systems carrying out any suitable actions.

Figure 2:
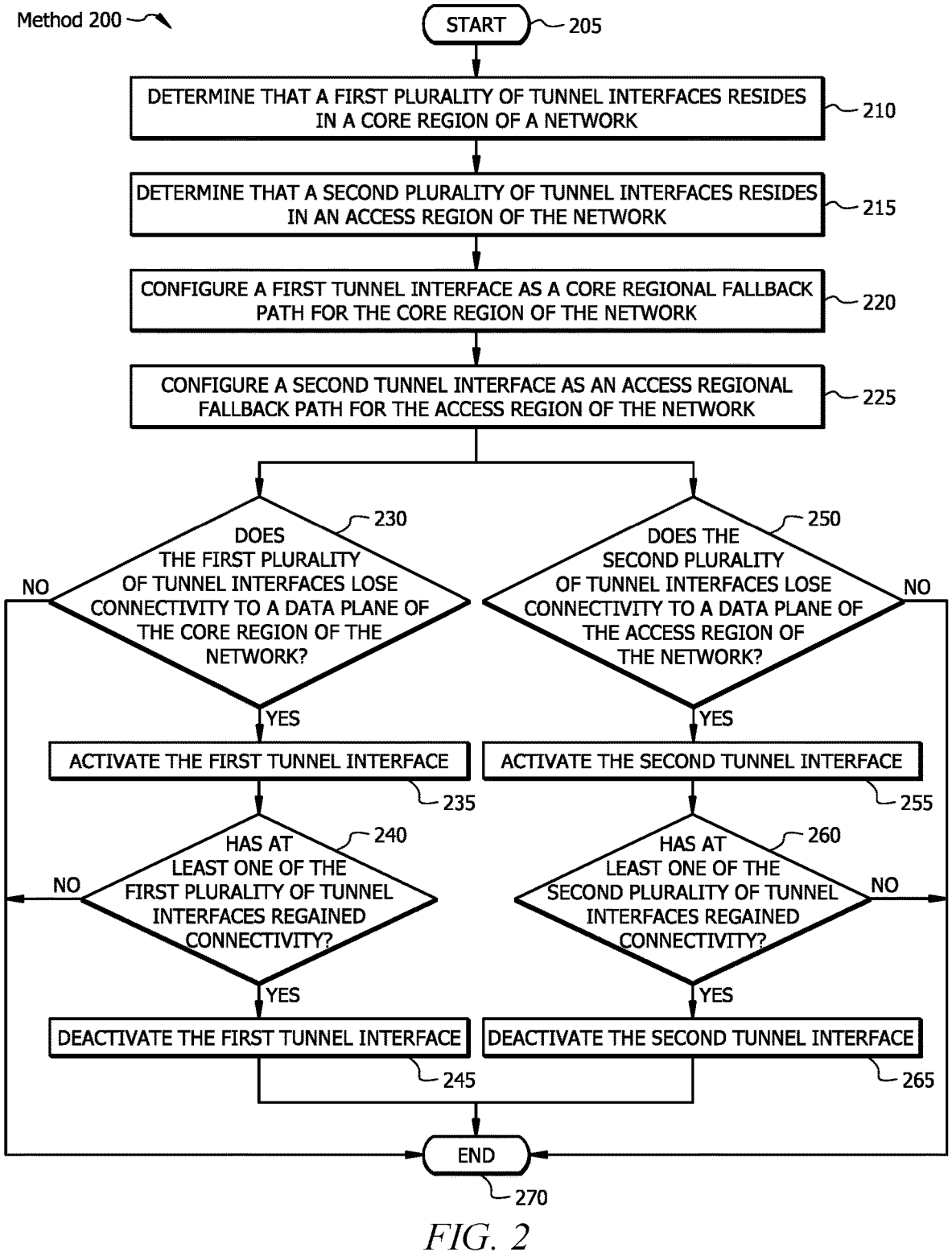
FIG. 2 illustrates an example method for generating an ultimate regional fallback path for hierarchical SD-WAN.

FIG. 2 illustrates an example method for generating an ultimate regional fallback path for hierarchical SD-WAN. Method 200 begins at step 205. At step 210 of method 200, a border router residing at the boundary of a core region and an access region of a network determines that a first plurality of its tunnel interfaces resides in the core region of the network. For example, referring to FIG. 1, border router 130a of system 100 may determine that tunnel interfaces 160a reside in core region 120a of network 110. Method 200 then moves from step 210 to step 215, where the border router determines that a second plurality of its tunnel interfaces resides in the access region of the network. For example, referring to FIG. 1, border router 130a of system 100 may determine that tunnel interfaces 160b reside in access region 120b of network 110. Method 200 then moves from step 225 to step 220.

At step 220 of method 200, the border router configures a first tunnel interface as a core regional fallback path for the core region of the network. For example, referring to FIG. 1, border router 130a may configure fallback tunnel interface 170a as a core regional fallback path for core region 120a of network 110. Method 200 then moves from step 220 to step 225, where the border router configures a second tunnel interface as an access regional fallback path for the access region of the network. For example, referring to FIG. 1, border router 130a may configure fallback tunnel interface 170b as an access regional fallback path for access region 120b of network 110. Method 200 then branches off to step 230 and step 255.

At step 230 of method 200, the border router determines whether the first plurality of tunnel interfaces loses connectivity with a data plane of the core region of the network. For example, referring to FIG. 1, border router 130a may determine that tunnel interfaces 160a of core region 120a lose connectivity to a data plane of core region 120a of core network 110a. If the border router determines that one or more of the first plurality of tunnel interfaces do not lose connectivity with the data plane of the core region of the network, method 200 advances from step 230 to step 270, where this branch of method 200 ends. If, at step 230 of method 200, the border router determines that the first plurality of tunnel interfaces loses connectivity with a data plane of the core region of the network, method 200 moves to step 235, where the border router activates the first tunnel interface. For example, referring to FIG. 1, border router 130a may activate fallback tunnel interface 170a of core region 120a. Method 200 then moves from step 235 to step 240.

At step 240 of method 200, the border router determines whether at least one of the first plurality of tunnel interfaces has regained connectivity with the data plane of the core region of the network. For example, referring to FIG. 1, border router 130a may determine that at least one of the first plurality of tunnel interfaces 160a has regained connectivity with the data plane of core region 120a of network

110. If the border router determines that none of the first plurality of tunnel interfaces has regained connectivity with the data plane of the core region of the network, method 200 advances from step 240 to step 270, where method 200 ends. If, at step 240, the border router determines that one or more of the first plurality of tunnel interfaces has regained connectivity with the data plane of the core region of the network, method 200 moves from step 240 to step 245. At step 245 of method 200, the border router deactivates fallback tunnel interface 170a. For example, referring to FIG. 1, border router 130a may deactivate fallback tunnel interface 170a of core region 120a. Method 200 then moves from step 245 to step 270, where method 200 ends.

As previously mentioned, step 225 of method 200 also branches off to step 250. At step 250 of method 200, the border router determines whether the second plurality of tunnel interfaces loses connectivity with the data plane of the access region of the network. For example, referring to FIG. 1, border router 130a may determine that tunnel interfaces 160b of access region 120b lose connectivity to the data plane of access region 120b of core network 110a. If the border router determines that one or more of the second plurality of tunnel interfaces do not lose connectivity with the data plane of the access region of the network, method 200 advances from step 250 to step 270, where the second branch of method 200 ends. If, at step 250 of method 200, the border router determines that the second plurality of tunnel interfaces loses connectivity with the data plane of the access region of the network, method 200 moves to step 255, where the border router activates the second tunnel interface. For example, referring to FIG. 1, border router 130a may activate fallback tunnel interface 170b of access region 120b. Method 200 then moves from step 255 to step 260.

At step 260 of method 200, the border router determines whether at least one of the second plurality of tunnel interfaces has regained connectivity with the data plane of the access region of the network. For example, referring to FIG. 1, border router 130a may determine that at least one of the second plurality of tunnel interfaces 160b has regained connectivity with the data plane of access region 120b of network 110. If the border router determines that none of the second plurality of tunnel interfaces has regained connectivity with the data plane of the access region of the network, method 200 advances from step 260 to step 270, where the second branch of method 200 ends. If, at step 260, the border router determines that one or more of the second plurality of tunnel interfaces has regained connectivity with the data plane of the access region of the network, method 200 moves from step 260 to step 265. At step 265 of method 200, the border router deactivates the second tunnel interface. For example, referring to FIG. 1, border router 130a may deactivate fallback tunnel interface 170b of access region 120b. Method 200 then moves from step 265 to step 270, where the second branch of method 200 ends. As such, method 200 of FIG. 2 ensures end-to-end data plane connectivity on a per-region basis in a hierarchical SD-WAN.

Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates an example method for generating an ultimate regional fallback path for hierarchical SD-WAN including the particular steps of the method of FIG. 2, this disclosure contemplates any suitable method for generating an ultimate regional fallback path for hierarchical SD-WAN including any suitable steps, which may include all, some, or none of the steps of the method of FIG. 2, where appropriate. Although FIG. 2 describes and illustrates particular components, devices, or systems carrying out particular actions, this disclosure contemplates any suitable combination of any suitable components, devices, or systems carrying out any suitable actions.

Figure 3:
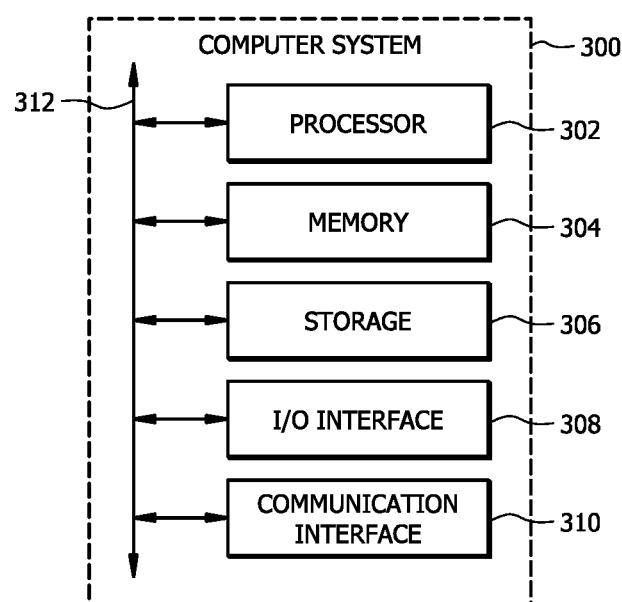
FIG. 3 illustrates an example computer system that may be used by the systems and methods described herein.

FIG. 3 illustrates an example computer system 300. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or universal serial bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 406. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 308 may include one or more device or software drivers enabling processor 302 to drive one or more of these I/O devices. I/O interface 308 may include one or more I/O interfaces 408, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network node comprising one or more processors and one or more computer-readable non-transitory storage media coupled to the one or more processors and including instructions that, when executed by the one or more processors, cause the network node to perform operations comprising:
   determining that a first plurality of tunnel interfaces resides in a core region of a network;
   determining that a second plurality of tunnel interfaces resides in an access region of the network;
   configuring a first tunnel interface as a core regional fallback path for the core region of the network;
   configuring a second tunnel interface as an access regional fallback path for the access region of the network;
   determining whether to activate the first tunnel interface or the second tunnel interface in response to one or more connectivity losses within the network;
   in response to determining that the first plurality of tunnel interfaces loses connectivity to a data plane of the core region of the network, activating, by the network node, the first tunnel interface; and
   in response to determining that the second plurality of tunnel interfaces loses connectivity to a data plane of the access region of the network, activating, by the network node, the second tunnel interface, wherein:
   the network node is a border router, the border router comprising the first plurality of tunnel interfaces and the second plurality of tunnel interfaces; and
   the border router is located at a boundary of the core region and the access region.

2. The network node of claim 1, wherein a determination to activate the first tunnel interface is independent of a determination to activate the second tunnel interface.

3. The network node of claim 1, wherein:
   the first tunnel interface is connected to a first Internet Protocol Security (IPSec) data plane tunnel that resides in the core region; and
   the second tunnel interface is connected to a second IPSec data plane tunnel that resides in the access region.

4. The network node of claim 1, further comprising using Bidirectional Forwarding Detection (BFD) to determine data plane connectivity within the network.

5. The network node of claim 1, wherein:
   the network is a hierarchical software-defined wide area network (SD-WAN).

6. A method, comprising:
   determining, by a network node, that a first plurality of tunnel interfaces resides in a core region of a network;
   determining, by the network node, that a second plurality of tunnel interfaces resides in an access region of the network;
   configuring, by the network node, a first tunnel interface as a core regional fallback path for the core region of the network;
   configuring, by the network node, a second tunnel interface as an access regional fallback path for the access region of the network;
   determining whether to activate the first tunnel interface or the second tunnel interface in response to one or more connectivity losses within the network;

in response to determining that the first plurality of tunnel interfaces loses connectivity to a data plane of the core region of the network, activating, by the network node, the first tunnel interface; and in response to determining that the second plurality of tunnel interfaces loses connectivity to a data plane of the access region of the network, activating, by the network node, the second tunnel interface, wherein:

the network node is a border router, the border router comprising the first plurality of tunnel interfaces and the second plurality of tunnel interfaces; and the border router is located at a boundary of the core region and the access region.

7. The method of claim 6, wherein a determination to activate the first tunnel interface is independent of a determination to activate the second tunnel interface.

8. The method of claim 6, wherein:

the first tunnel interface is connected to a first Internet Protocol Security (IPSec) data plane tunnel that resides in the core region; and the second tunnel interface is connected to a second IPSec data plane tunnel that resides in the access region.

9. The method of claim 6, further comprising using, by the network node, Bidirectional Forwarding Detection (BFD) to determine data plane connectivity within the network.

10. The method of claim 6, wherein:

the network is a hierarchical software-defined wide area network (SD-WAN).

11. One or more computer-readable non-transitory storage media embodying instructions that, when executed by a processor, cause the processor to perform operations comprising:

determining that a first plurality of tunnel interfaces of a border router resides in a core region of a network;

determining that a second plurality of tunnel interfaces of the border router resides in an access region of the network;

configuring a first tunnel interface as a core regional fallback path for the core region of the network;

configuring a second tunnel interface as an access regional fallback path for the access region of the network;

determining whether to activate the first tunnel interface or the second tunnel interface in response to one or more connectivity losses within the network;

in response to determining that the first plurality of tunnel interfaces loses connectivity to a data plane of the core region of the network, activating, by a network node, the first tunnel interface; and in response to determining that the second plurality of tunnel interfaces loses connectivity to a data plane of the access region of the network, activating, by the network node, the second tunnel interface, wherein:

the network node is a border router, the border router comprising the first plurality of tunnel interfaces and the second plurality of tunnel interfaces; and the border router is located at a boundary of the core region and the access region.

12. The one or more computer-readable non-transitory storage media of claim 11, wherein a determination to activate the first tunnel interface is independent of a determination to activate the second tunnel interface.

13. The one or more computer-readable non-transitory storage media of claim 11, wherein:

the first tunnel interface is connected to a first Internet Protocol Security (IPSec) data plane tunnel that resides in the core region; and the second tunnel interface is connected to a second IPSec data plane tunnel that resides in the access region.

14. The one or more computer-readable non-transitory storage media of claim 11, further comprising using Bidirectional Forwarding Detection (BFD) to determine data plane connectivity within the network.

* * * * *